United States Patent [19]

Michiels

[11] Patent Number: 4,767,485
[45] Date of Patent: Aug. 30, 1988

[54] HIGH SPEED EXTRUSION COATING WITH ETHYLENE COPOLYMERS

[75] Inventor: Dirk J. M. Michiels, Zwijndrecht, Belgium

[73] Assignee: Exxon Research & Engineering Co., Florham Park, N.J.

[21] Appl. No.: 861,113

[22] Filed: May 6, 1986

Related U.S. Application Data

[63] Continuation of Ser. No. 655,276, Sep. 26, 1984, abandoned.

[30] Foreign Application Priority Data

Sep. 30, 1983 [GB] United Kingdom ................ 8326277

[51] Int. Cl.$^4$ ............................................. B29C 47/78
[52] U.S. Cl. ............................... 156/244.11; 427/326; 427/391; 427/395; 428/511
[58] Field of Search .................. 156/244.11; 427/326, 427/391, 395, 424; 428/511, 537.5

[56] References Cited

U.S. PATENT DOCUMENTS

| | | | |
|---|---|---|---|
| 4,339,507 | 7/1982 | Kurtz et al. | 427/391 |
| 4,481,262 | 11/1984 | Shida et al. | 428/511 |
| 4,505,969 | 3/1985 | Weiner | 156/244.11 |

FOREIGN PATENT DOCUMENTS 3129271 11/1978 Japan ................ 156/244.11

Primary Examiner—Caleb Weston
Attorney, Agent, or Firm—J. F. Hunt; C. E. Smith

[57] ABSTRACT

Extrusion coating with high line speeds of up to 600 mpm may be achieved without sacrificing the adhesion of the coating to the substrate by using an ethylene copolymer with up to 3% by weight copolymer, preferably 0.5 to 2.5% by weight VA, as the coating polymer. The extrusion temperature is in the region of incipient degradation, but maintained below the level which gives undesired degradation leading to odor or discoloration.

9 Claims, 3 Drawing Sheets

Line speed 175 mpm
Coating weight 25 gsm.

Melt temperature 315°C
Coating weight 12 gsm.

HIGH SPEED EXTRUSION COATING WITH ETHYLENE COPOLYMERS

This is a continuation of application Ser. No. 655,276, filed 9/26/84, abandoned.

This invention relates to extrusion coating of plastics materials onto a substrate, and in particular to high speed extrusion of ethylene copolymers.

In recent years, efforts have been made to improve adhesion of extrusion coatings onto non-porous, flexible substrates, such as metal foils and polymer films. However, the copolymers developed for these applications were too expensive to be attractive in industrial paper coating applications. A low cost resin with good paper adhesion is sought for this application, which also employs high line speeds to lower production cost.

Conventional extrusion processes for coating paper use polyethylene or polypropylene as the plastics material, e.g. GB No. 1 418 909 and GB No. 1 508 032. EP No. 0052889 discloses the use as an extrusion coating composition of a mixture of higher pressure low density polyethylene homopolymer and/or copolymer and a linear low density ethylene hydrocarbon copolymer such as an ethylene/butene-1 copolymer.

Ethylene-vinyl acetate copolymers (EVA) have been described for extrusion coatings. GB No. 1 222 665 describes extrusion coating of EVAs at temperatures of up to 232° C. onto a variety of substrates. The ethylene:vinyl acetate ratios described range from 4:1 to 2:1 by weight corresponding to 20% to 35% by weight vinyl acetate (VA). GB No. 1 209 424 describes the extrusion of a readily extrudable polymer such as a copolymer of ethylene with a minor amount of vinyl acetate together with a propylene polymer to form a composite coating. GB No. 1 214 325 indicates that extrusion at high temperatures is required to give good adhesion and that the use of EVA at such temperatures has not been successful because of decomposition or oxidation of the EVA. This patent describes the use of an electric discharge to promote adhesion in conjunction with ethylene copolymers containing 3 to 4% or 5 to 20% by weight of comonomer.

We have now found that extrusion coating may be carried out with high adhesion at high line speeds by using ethylene copolymers with a low monomer content under controlled temperature conditions.

Thus, in one aspect this invention provides a method of extrusion coating a substrate with a layer of an ethylene copolymer, in which an ethylene copolymer containing less than 3% by weight of comonomer is heated to a temperature below that at which undesirable degradation of the copolymer takes place and extruded onto the substrate.

We have found that the incorporation of small amounts of comonomer catalyses the oxidation of the copolymer relative to an ethylene homopolymer. Since the oxidised form of the polymer has better adhesion the catalysis of this oxidation, and thus the reduction of the time for formation of the oxidised form, enables extrusion coating to be carried out at higher speeds. However, by controlling the temperature of extrusion in the region of incipient degradation the benefits of improved adhesion may be obtained without significant amounts of degradation which may lead to problems of discolouring, odour and bubble formation. Moreover, the copolymers used in the present invention have a low comonomer content which enables extrusion to be carried out at higher temperatures than with conventional copolymers containing greater amounts of comonomer without degradation problems.

It has been found that there is a logarithmic relationship between the comonomer content and the degradation temperature of the copolymer:

$$\ln X = a + \frac{b}{T_D}$$

where X is the % by weight of a comonomer, $T_D$ is the degradation temperature in °K, defined as the minimum temperature at which chemical breakdown takes place in an extruder operating at minimum extruder output and a and b are constants which will be set by extruder design, residence time, rate of extrusion and type of comonomer. The degradation temperature may be determined experimentally by operating an extruder at minimum output and increasing the extrusion temperature until degradation is observed in odour and/or bubble formation and/or discolouration. By operating at minimum output the residence time is maximised and the copolymer is subjected to the most severe degradation conditions.

Determining the degradation temperature/VA content relationship then enables the VA content of the coating material to be chosen having regard to the extrusion temperature that is desired, or vice versa. It is generally desirable for the VA content to be selected such that the chosen extrusion temperature is within 15° C. of the degradation temperature of the copolymer, preferably the chosen extrusion temperature is within 10° C., more preferably 5° C., of the degradation temperature and is preferably at or above the degradation temperature, most preferably from 5° to 10° C. above the degradation temperature since this results in the optimum conditions of adhesion of the extruded coating onto the substrate and avoidance of odour and discolouration. The process of the invention enables higher extrusion temperatures to be obtained without undesirable degradation of the extruded copolymer by limiting the comonomer content so enabling the extrusion coating to be carried out more rapidly, while obtaining improved adhesion as compared to conventional systems.

By way of illustration, preferred maximum extrusion temperatures for a range of EVA with different VA contents are set out in Table 1 below.

TABLE 1

| % VA by weight | Degradation temperature $T_D$(°C.) | Preferred extrusion temperature (°C.) |
|---|---|---|
| 3 | 285 | 290–295 |
| 2.5 | 290 | 295–300 |
| 1 | 312 | 317–322 |
| 0.5 | 335 | 340–345 |

While the preferred copolymers for use in the invention are EVAs it is also possible to use other copolymers where the comonomer has the effect of reducing thermal stability. Thus, it is possible to employ copolymers wherein the comonomer is a vinyl ester such as vinyl propionate, acrylic acid or methacrylic acid, an acrylate such as ethyl acrylate, a methacrylate such as methyl methacrylate or an alcohol such as allyl alcohol or vinyl alcohol (which may be the result of hydrolysis of vinyl acetate in an EVA). The copolymers may also contain two or more comonomers, preferably selected from those listed hereinbefore. Also included within the scope of the invention are graft copolymers with such comonomers.

The comonomer content is preferably from 0.1 to 2.5% by weight, more preferably from 0.5 to 2% by weight. Particularly preferred copolymers are EVAs containing in the region of 1% by weight VA.

The copolymer will typically be a low density ethylene copolymer and thus preferably has a density of 0.915 to 0.935 gm cm$^{-3}$, more preferably of from 0.915 to 0.925 gm cm$^{-3}$. The melt index of the copolymer is not critical, but is preferably in the range of 2 to 25, more preferably from 3 to 8, since such polymers are more easily handled.

The copolymers for use in the invention may be prepared by any conventional technique, and thus for example in a high pressure, radical initiated process using autoclave or tubular reactors, or in a solution, slurry or gas phase process at lower pressure. It is within the competence of the skilled man to prepare appropriate materials using such well-established techniques.

We beleive that the processability of the copolymers used in the invention are enhanced by increased long chain branching which is a characteristic of copolymers produced by high pressure radical processes and accordingly such preparations are preferred.

The method of the invention may utilize a normal extrusion coating procedure. In general extrusion coating comprises heating the polymer to be extruded to the desired extrusion temperature, usually in an extruder provided with a screw, and extruding it through a slot-shaped die towards the substrate to be coated. While in the molten state the polymer is drawn together with the substrate between a pair of rollers forming a nip. The rollers are biassed towards each other to effect lamination of the molten polymer onto the substrate to form the desired coating. Normally the roller adjacent the polymer is cooled, for example by water, and the other roller is usually formed of a compressible material such as rubber. The cooled roller is generally maintained at a temperature below that at which the polymer sticks to avoid adhesion to that roller.

The air gap may be adjusted to vary the draw ratio and/or vary the degree of surface oxidation. The speed of rotation of the rollers in the nip and the extruder output may also be varied to control the thickness of the polymer layer applied to the substrate.

The term "extrusion coating" as used herein is to be construed to include extrusion lamination in which the molten polymer is extruded between two substrates which then pass through the nip to form a laminated product in which the two substrates are bonded by the intervening extruded layer.

The extrusion coating method of the invention may be used at line speeds (speed of movement of the substrate through the coating process) of up to 600 meters per minute (mpm) or even higher—there may be some applications where 1000 mpm or more is appropriate. Typical line speeds for the method of the invention are 100 to 1000 mpm, preferably 100 to 450 mpm and more preferably from 200 to 450 mpm, and it is a surprising feature of the invention that at these very high line speeds it is possible to obtain a coating with good adhesion to the substrate. In general it is believed that the method of the invention enables an increase in line speed of from 5 to 20%, typically up to 10%, to be obtained as compared to the line speed of a conventional extrusion coating with polyethylene homopolymer.

The coating weight on the substrate will generally be determined by the ratio between the extruder output and the line speed. Typical coating weights are from 3 to 200 gm$^{-2}$, preferably 5 to 50 gm$^{-2}$ and more preferably 5 to 40 gm$^{-2}$.

A wide range of substrates may be coated by the method of the invention including paper, metal foils such as aluminium and plastics materials including polyethylene, polypropylene, polyester, nylon and regenerated cellulose film.

The invention will now be described in more detail, though only by way of illustration, in the following Examples. Reference is made to the accompanying drawings, in which.

In the Examples the method of the invention using an EVA is compared to conventional extrusion coating using a polyethylene homopolymer. Details of the polymers used are given in Table 2 below:

TABLE 2

| Polymer | 1 | A |
|---|---|---|
| Melt index, g/10 min | 4,40 | 4,50 |
| Density, g/cc | 0,9245 | 0,9240 |
| VA-content, % | 0,92 | — |
| Optical melting point, °C. | 108,5 | 111 |
| Vicat Softening point, °C. | 96,3 | 98,5 |
| Hexane extractables, % | 0,73 | 0,85 |

Degradation Temperature

Polymer 1 was extruded from a 3½ inch, 30 L/D EGAN extruder at low extruder output (10 rpm screw speed), increasing melt temperature in the extruder stepwise (5° C. steps). Up to 310° C., it showed no signs of degradation. At 315° C., the odour increased significantly. At melt temperatures of 320° C. and above, the melt turned yellow. However, these phenomena disappeared when the screw speed was increased from 10 to 100 rpm (shorter residence time). Above 325° C., severe degradation was observed as increasd odour and discolouration.

The above observations are in agreement with the degradation temperature calculated according to the relation expressed hereinbefore. It must be taken into account that during this experiment the melt was allowed to fall freely from the extruder onto the floor, and thus remained at elevated temperatures for a long period of time.

Neck-in/drawdown

Neck-in was measured for Polymer 1 and compared with Polymer A at different temperatures (330°, 312°, and 325° C.) and constant line speed and coating weight (respectively 175 mpm/25 gm$^{-2}$). During a second experiment the influence of line speed was studied at constant melt temperature and coating weight (315° C./12 gm$^{-2}$).

Figure 1:
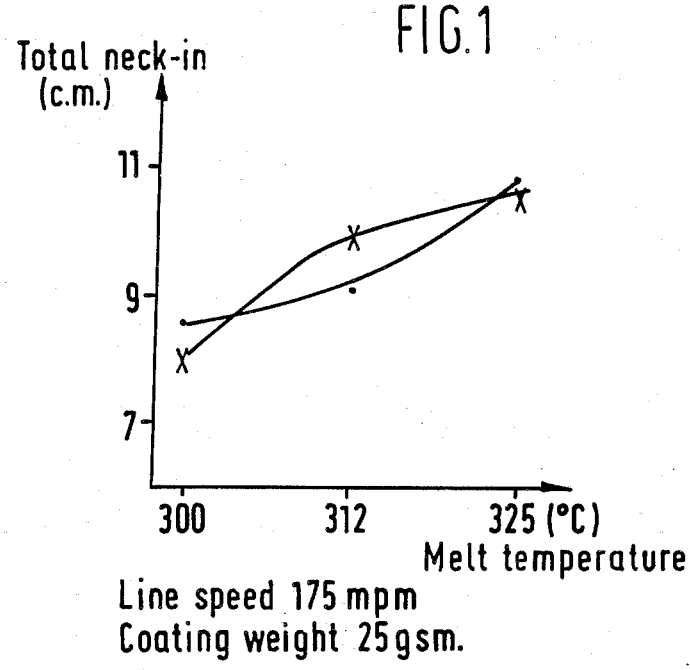
FIG. 1 is a graph of total neck-in as a function of melt temperature for an EVA for use in the invention and a conventional polyethylene.
Figure 2:
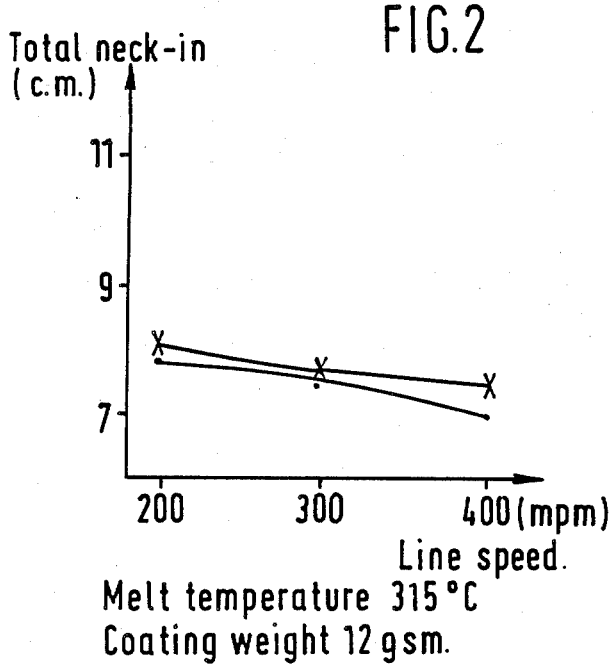
FIG. 2 is a graph of total neck-in as a function of line speed for the polymers of FIG. 1.

As shown in FIGS. 1 and 2 only very small differences were observed between Polymer 1 and Polymer A. According to requirements the neck-in/drawdown balance could easily be adjusted by changing average molecular weight and/or degree of long-chain branching.

The drawdown of Polymer 1 was exceptionally good, having no melt break nor signs of edge instability at 500 mpm in line speed and 10 gm$^{-2}$ coating weight.

EXAMPLE 1

The adhesive properties of the coating obtained using Polymer 1 in the process of the invention were compared over a range of process variables with a comparison process using Polymer A. Minor influencing parameters were kept constant (nip pressure, air gap, contact angle) while major parameters were varied through the entire practical range.

The substrate used during these tests is a 75 gm$^{-2}$ natural Kraft paper. Adhesions were tested on a Perkin-Southwick bond-tester. Results are given in Table 3 in kPa.

TABLE 3

Adhesion at different extrusion coating conditions

| Conditions | | | Adhesion kPa | |
|---|---|---|---|---|
| Melt Temp °C. MT | Line Speed (mpm) LS | Coating Weight (gsm) CW | Comparison | Example 1 |
| 300 | 50 | 10 | 23 | 66 |
| 300 | 50 | 40 | 330 | 340 |
| 300 | 175 | 25 | 124 | 159 |
| 300 | 300 | 10 | 26 | 54 |
| 300 | 300 | 40 | 31 | 59 |
| 312 | 175 | 25 | 182 | 288 |
| 325 | 50 | 10 | — | — |
| 325 | 50 | 40 | 367 | 317 |
| 325 | 175 | 25 | 334 | 297 |
| 325 | 300 | 10 | 371 | 161 |
| 325 | 300 | 40 | 174 | 298 |

In this test excellent adhesion is represented by results in excess of 300 kPa, while results in excess of 275 kPa are acceptable. At 325° C./50 mpm/10 gm$^{-2}$, adhesion results were too scattered as a result of high neck-in values and are not given.

Conclusions

At 300° C., acceptable adhesion is obtained only at low line speed/high coating weight conditions. Example 1 gave better results.

At intermediate condtions (312° C.-175 mpm-25 gsm), the method of Example 1 has a tremendously positive effect on adhesion.

At 325° C. melt temperature, the effect of the invention is visible at high line speeds (300 mpm) and high coating weight.

EXAMPLE 2

Figure 3:
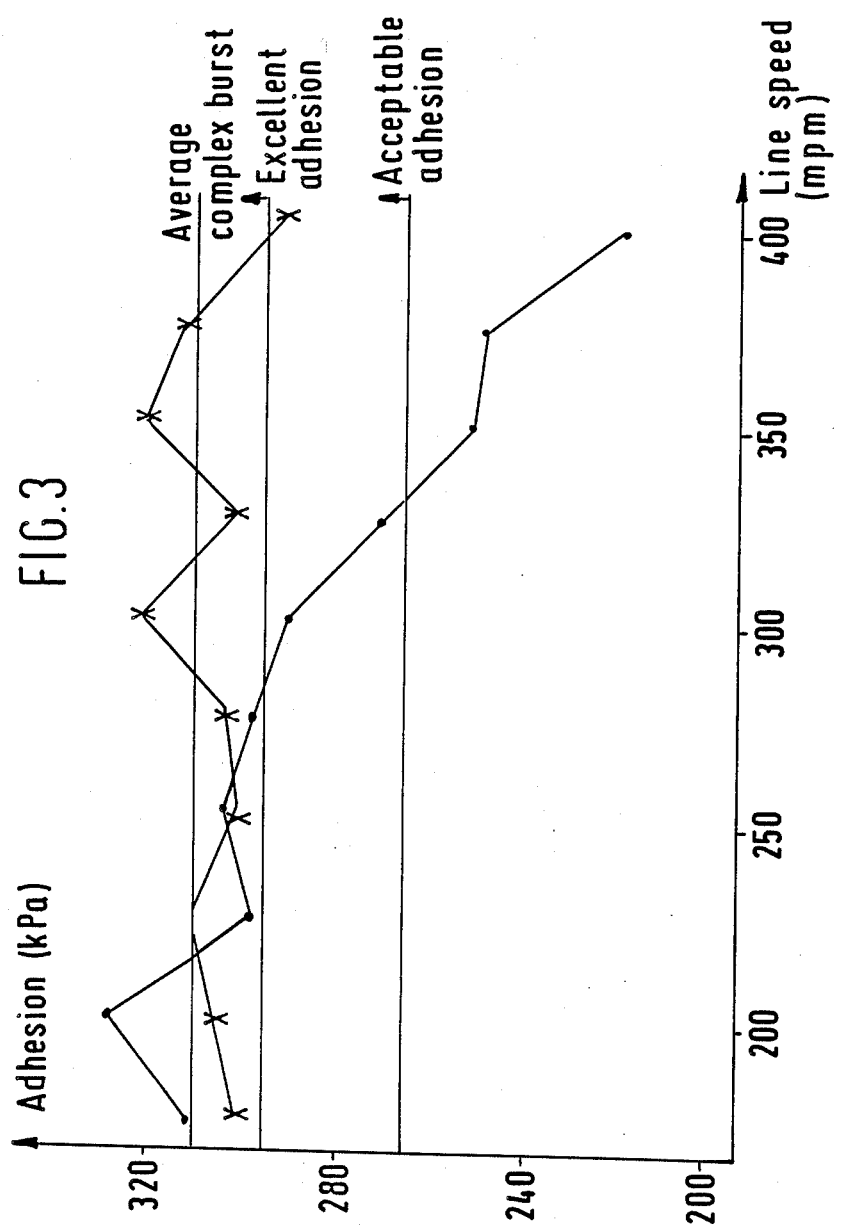
FIG. 3 is a graph of adhesion as a function of line speed for the method of the invention as compared to a conventional extrusion coating method.

As an indication of performance in high speed paper coating applications, extrusion was carried out under the following conditions:
melt temperature=315° C. fixed
coating weight=12 gm$^{-2}$ fixed
line speed=175-400 mpm variable in 25 mpm/steps.
substrate=76 gm$^{-2}$ natural kraft paper
Again Polymer A was used in the comparison. Results of these tests are given in Table 4 and FIG. 3.

TABLE 4

Adhesion as a function of line speed

| | Adhesion (kPa) | |
|---|---|---|
| Line speed (mpm) | Example 2 | Comparison |
| 175 | 300E | 312E |
| 200 | 305E | 327E |
| 225 | 308E | 297E |
| 250 | 300E | 302E |
| 275 | 302E | 297E |
| 300 | 321E | 290A |
| 325 | 300E | 270A |
| 350 | 320E | 250NA |
| 375 | 312E | 249NA |
| 400 | 291A | 219NA |

E = Excellent adhesion
A = Acceptable adhesion
NA = Not acceptable adhesion
Average complex burst strength: 310 kPa
Excellent adhesion (>95%) = 295 kPa
Acceptable adhesion (>85%) = 265 kPa Conclusions The adhesion in the comparison method starts to drop at 275-300 mpm, but Example 2 gives excellent adhesion up to 375-400 mpm. This 33% line speed increase can only be attributed to the presence of vinyl acetate comonomer.

Test 1: Sealability & Hot tack

Figure 4:
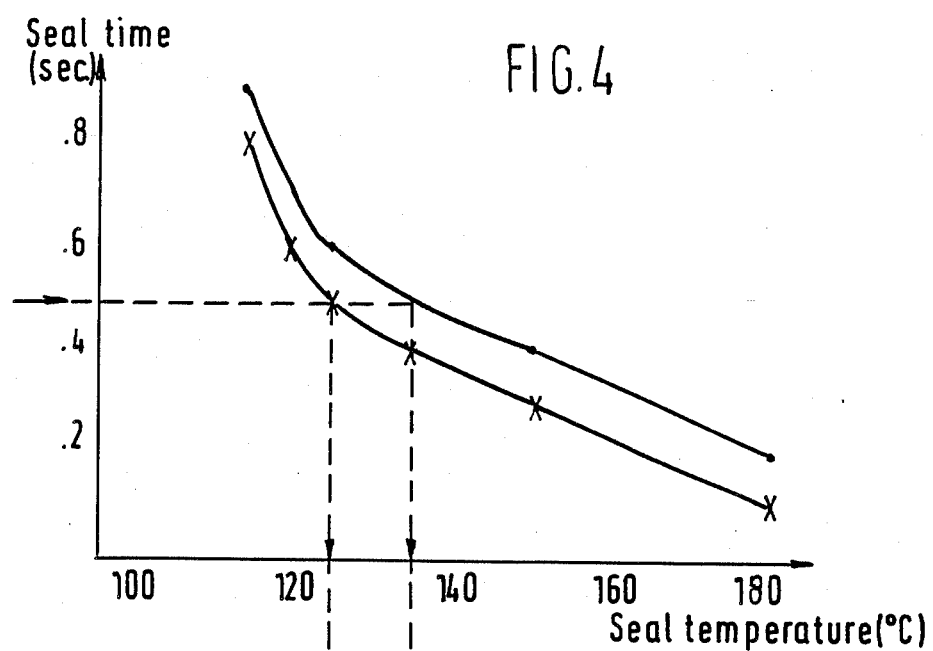
FIGS. 4 and 5 are graphs of seal time and hot tack, respectively, as a function of seal temperature.
Figure 5:
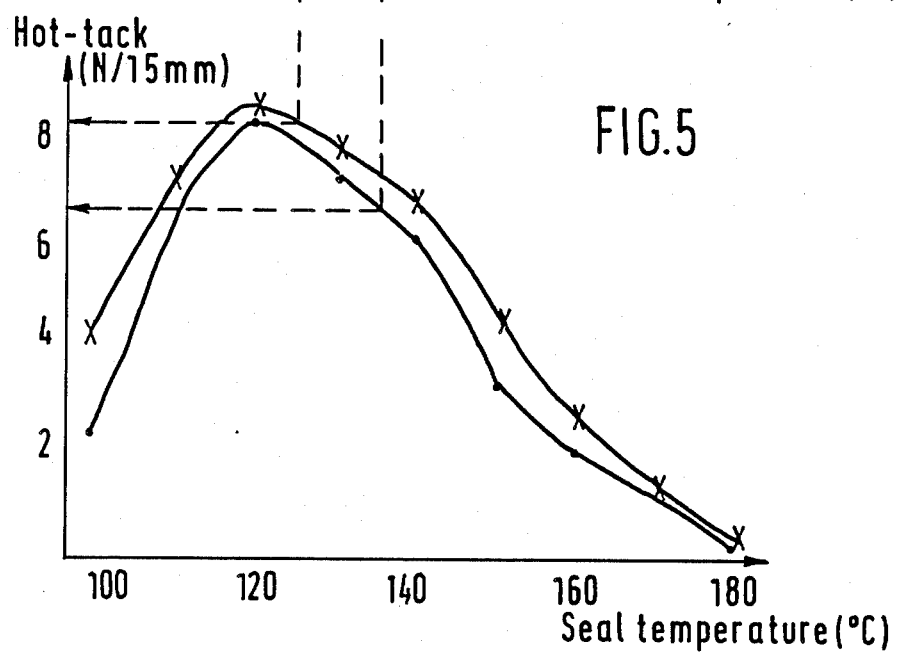

Minimum seal time (sentinel-heat-sealer) and hot track (Packforsk-hot tack tester) were determined for a 12 gsm coating onto 75 gsm natural kraft paper. Results are summarized in Table 5 and shown in FIGS. 4 and 5.

TABLE 5

Minimum seal time and hot tack at various seal temperatures

| | Heat stability minimum seal time (sec) | | Hot tack strength (N/15 mm) | |
|---|---|---|---|---|
| Temperature (°C.) | Polymer 1 | Polymer A | Polymer 1 | Polymer A |
| 100 | >1 | >1 | 4,4 | 2,4 |
| 110 | >1 | >1 | 7,3 | 6,7 |
| 115 | 0,8 | 0,9 | — | — |
| 120 | 0,6 | 0,7 | 8,8 | 8,6 |
| 125 | 0,5 | 0,6 | — | — |
| 130 | — | — | 7,9 | 7,4 |
| 135 | 0,4 | 0,5 | — | — |
| 140 | — | — | 6,9 | 6,2 |
| 150 | 0,3 | 0,4 | 4,6 | 3,4 |
| 160 | — | — | 2,7 | 2,1 |
| 170 | — | — | 1,4 | 1,3 |
| 180 | 0,1 | 0,2 | 0,4 | 0,2 |

Both minimum heat seal temperature and hot-tack are better for Polymer 1 than Polymer A. At relatively short seal times (<0,45 sec), the minimum seal temperature is lowered by approximately 15° C. for Polymer 1.

The hot-tack strength is only slightly higher at similar temperatures. However, one should compare at similar seal times with the temperature necessary to obtain a good seal. As shown in the following Table 7 Polymer 1 has a better hot tack strength at the same seal temperature.

| | Polymer 1 | Polymer A |
|---|---|---|
| Mininum seal temperature (°C.) at 0,5 sec seal time | 125 | 135 |
| Hot tack strength (N/15 mm) at 0,5 sec min seal time | 8,5 | 6,8 |

At higher seal speeds this difference will become even more important.

Test 2: MVTR

Using the same materials as tested in Test 1, moisture vapour transmission rates were measured according to the TAPPI-method at tropical conditions (38° C.-95% RH). For each sample, the MVTR was measured with both coating and substrate facing the humid atomsphere.

| Condition | Resin | MVTR (g/m$^2$/24 h) | Coating weight (g/m$^2$) |
|---|---|---|---|
| Coating facing humid atm. | Polymer 1 | 37,60 | 12,6 |
|  | Polymer A | 35,20 | 12,1 |
| Paper facing humid atm. | Polymer 1 | 49,35 | 12,7 |
|  | Polymer A | 46,05 | 11,9 |

A drop in the barrier properties of the coating using Polymer 1 of approximately 7% versus Polymer A but the MVTR is still acceptable.

What is claimed is:

1. A method of extrusion coating a substrate with a layer of a low density ethylene copolymer comprising extruding a layer consisting essentially of low density ethylene copolymer containing less than 3% by weight of a comonomer selected from vinyl esters, acrylic acids, or methacrylic acids, acrylates or methacrylates and unsaturated alcohols from an extruder onto the substrate at a temperature in the range of $T_D \pm 15°$ C. where $T_D$ is the degradation temperature in °C. of the copolymer, defined as the minimum temperature at which chemical breakdown occurs with the extruder operating at minimum output.

2. A method as claimed in claim 1, in which the coating weight on the substrate is from 3 to 200 gm$^{-2}$.

3. A method as claimed in claim 1, in which the extrusion temperature is in the range of $T_D \pm 10°$ C.

4. A method as claimed in claim 3, in which the extrusion temperature is $T_D \pm 5°$ C.

5. A method as claimed in claim 1, in which the copolymer is an EVA.

6. A method as claimed in claim 5, in which the VA content is from 0.1 to 2.5% by weight.

7. A method as claimed in claim 1, in which the copolymer has a density of 0.915 to 0.935 cm$^{-3}$ and a melt index in the range of 2 to 25.

8. A method as claimed in claim 1, in which the substrate passes the extruder at a line speed of 100 to 1000 meters per minute.

9. A method of forming a composite comprising coextruding onto a paper substrate a layer of a low density ethylene copolymer from an extruder onto the substrate at a temperature in the range of $T_D \pm 15°$ C. where $T_D$ is the degradation temperature in °C. of the copolymer, defined as the minimum temperature at which chemical breakdown occurs with the extruder operating at minimum output, said ethylene copolymer containing less than 3% by weight of a comonomer selected from vinyl esters, acrylic acids or methacrylic acids, acrylates or methylacrylates and unsaturated alcohols.

* * * * *